Oct. 19, 1971  W. S. McKINSTRY  3,613,121

FLUSHING APPARATUS FOR A WATER CLOSET

Filed April 27, 1970

INVENTOR
WILLIAM S. McKINSTRY
BY
Baldwin, Egan, Walling & Fetzer
ATTORNEYS

United States Patent Office 3,613,121
Patented Oct. 19, 1971

3,613,121
FLUSHING APPARATUS FOR A WATER CLOSET
William S. McKinstry, 1520 Waterbury Road,
Lakewood, Ohio 44107
Filed Apr. 27, 1970, Ser. No. 32,235
Int. Cl. E03d 1/22; F16l 55/00
U.S. Cl. 4—40
7 Claims

ABSTRACT OF THE DISCLOSURE

A flushing unit for a water closet comprising a pressurized water supply, a manually operable valve in the supply line, said valve discharging into a silencer chamber that contains a silencer element in the form of a spreader that receives the valve discharge and distributes it uniformly in the chamber from whence the liquid is quietly discharged through a conduit that leads directly into the inlet of the toilet bowl.

---

In the conventional water closet, the toilet bowl is associated with the flush tank or reservoir from which flush water runs by gravity into the bowl; means are provided in the tank to supply it with water under control of a float valve that determines the fill of the tank. Further, the tank outlet is formed with a seat that supports a bulb to seal the outlet and with further means, manually operable, to lift the bulb and open the outlet allowing water to run into the bowl.

This conventional arrangement has several inherent disadvantages that might be enumerated as follows:

(1) The operation of the device is noisy, particularly during the filling cycle and again during the discharge period.

(2) There is an unnecessarily large volume of water used in its operation which results in unnecessary waste in water and the cost thereof.

(3) In certain climatic conditions, the large reservoir of cold water creates a "sweating" condition over the surface of the tank walls resulting in unsightly and harmful condensate accumulating on the tank and dropping to the floor in the area of the closet.

(4) The valving for supplying the refill to the tank, being of the float valve type, is subject to erratic operation and often requires adjustment and/or replacement at frequent intervals; continued use of a faulty valve leads to waste of water and noisy operation.

(5) The original cost of a flush closet incorporating a flush tank is expensive and the tank and its cover being generally of a porcelain or ceramic material are easily subject to breakage with attendant replacement costs.

Various attempts have been made to overcome the shortcomings stated above, but most proposed solutions have been expensive or only attack one of the several facets of the problem. For example, in some installations, primarily in public rest rooms, the use of a flush valve without the tank has been employed; such an arrangement has merit, but the practice has been to deliver the flush water directly to the bowl and the result has been very noisy operation. In fact this system is so noisy that it has generally been precluded from residential use.

Applicant has previously devised means for improving the conventional system; Pat. No. 3,362,030 issued Jan. 9, 1968 for a Water Closet covers one of applicant's earlier concepts. The present invention is a further development and attack on the problem along a new line of approach. Not only does the subject invention correct the shortcomings when installed in new equipment, but it also has the advantage of being applicable to existing installations so that they can be modified to obtain the benefit of the improvement.

Whereas there are many reasons for using the apparatus of this invention, probably the most compelling is the need to conserve water resources. Thus, the public authorities are becoming alarmingly aware of the wasteful practices in the use of our natural resources, among which water ranks high. This invention is designed to accomplish this and in addition offers many additional advantages, as pointed out herein.

SUMMARY OF THE INVENTION

The general principle of my invention is take flushing water for a toilet from a pressurized supply, and supply it to the flush bowl of a toilet in such a way that the operation is carried out quietly and quickly. To accomplish this, the invention employs a manually controlled valve that delivers flush water, on demand, from the supply source and directs it to the bowl along a path through a silencing chamber containing a silencer member which assists in delivering the flush water in a uniform flow pattern and quietly to the bowl. The silencer chamber is designed to have sufficient volume to allow the water discharged by the valve to flow by gravity therethrough to the bowl. Within the chamber is positioned the silencer member proximate to the discharge point of the valve and in generally symmetrical spaced relation with the side walls of the chamber so that the flush water impinges on the member and flows uniformly thereover in its travel to the outlet from the said chamber. The preferred shape of the element is spherical, but other symmetrical shapes are contemplated. The function of the chamber and element is to convert high pressure high velocity flow of flush water (as it emerges from the control valve) to non-turbulent, quiet flow of water entering the toilet bowl. This is done to reduce the undesirable "flushing" noise encountered in conventional water closets. It is further contemplated that my silencer chamber and silencer element be fabricated from sound deadening material. The advantages of this are two fold, namely; (1) that such material acts to further reduce the noise level of the flushing operation and (2) such composition reduces the initial cost of the parts and, being non-corrosive, assures long functional life.

The flushing unit of this invention may be installed in place of the conventional flush tank and its auxiliary equipment, or in the alternative, is adaptable to installation in the conventional flush tank in place of such auxiliary equipment.

BRIEF DESCRIPTION OF THE DRAWINGS

I will now describe the preferred embodiment of my invention having reference to the following drawings or figures in which.

DESCRIPTION OF PREFERRED EMBODIMENTS

Figure 1:
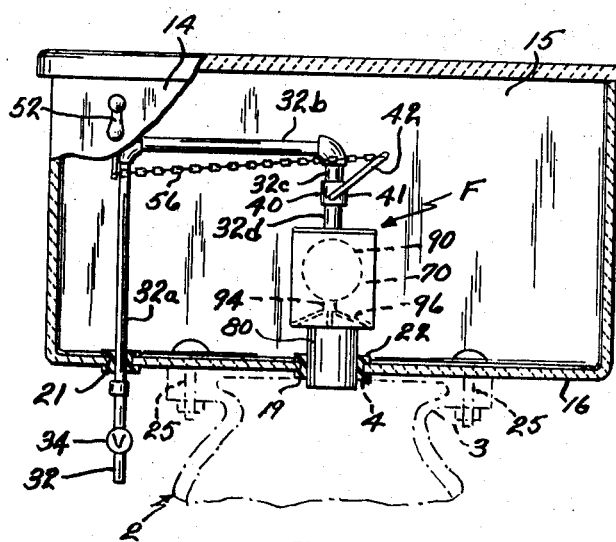
FIG. 1 is a front elevational view, partially in section, illustrating my flushing unit mounted in and associated with the conventional water closet tank.

Referring to FIG. 1, my flushing unit F is shown incorporated in the flush tank 10 of a conventional water closet. The tank 10 has the usual side walls 12, a front wall 14 and rear wall 15. The bottom wall 16 is adapted to rest upon the upper face of a flange 3 formed integral with the bowl 2 so that an outlet opening 22 of the tank registers with an inlet opening 4 for the bowl; appropriate sealing means 19 is employed to assure that there is no leakage at the bowl-tank connection, and in this illustration, such means are shown as being a flanged cylinder of resilient material. Conventional bolt and sealing washer means 25 may be employed to removably affix the tank 10 to the bowl 2. In the usual construction, water under pressure is supplied to the tank 10 by means of a water line 32 that passes through a seal 21 in an opening in the bottom wall 16 of the tank. As is well known in the art, when the conventional toilet is flushed, the flush water leaves the tank via outlet 22 and the usual float valve operates to refill the tank for the next cycle. Generally the flushing action is initiated by actuation of handle 52 mounted on the front wall and connected through appropriate linkage to the float valve member that normally closes the tank outlet 22.

The flushing unit F of this invention is designed to supplant the aforesaid float valve and to avoid the necessity of holding a reservoir of water in the tank 10. To this end, in one form, my unit F is placed over the outlet 22, is connected to the conventional water supply 32 and is linked to the actuating mechanism 52 as shown in FIG. 1.

This flushing unit F is comprised essentially of three parts, namely: (1) a valve 40 such as for instance a ball valve for control of the flow of flush water, (2) a silencer chamber 70 into which the water from valve 40 discharges and from which the water flows to the toilet bowl and (3) a silencer element 90 positioned within the silencer chamber in a manner to diffuse and distribute the flush water uniformly and assure its quiet passage into the closet bowl 2. The apparatus F is generally assembled as a unit and positioned over the outlet 22 of the tank as best seen in FIG. 1, and now to be described.

The flow control device 40, preferably a ball valve is of conventional construction having a body 41 adapted to be connected to the water supply line 32 by means of line sections 32a, 32b and 32c. The usual emergency shut off valve 34 may be placed in line 32. Extending into and pivoted on the body 41 of valve 40 is an actuating arm 42 in operative connection with the movable closure of the valve; this arm is adapted for connection to handle 52 and crank arm 54 by linkage 56. The valve may be operated by turning handle 52 and holding it during the flush cycle to keep valve 40 open (in other words, valve 40 may be spring loaded) or valve 40 may be provided with a timing arrangement that automatically closes it within a given time interval after its opening, without the necessity of holding the handle 52 actuated. These are known mechanism of the valve art.

Downstream from, and directly connected to the valve 40, is silencer chamber 70 formed as an enclosure with side, bottom and top walls 72, 74 and 76, respectively. A short nipple 32d connects valve 40 with an opening 77 in the top wall 76 of the silencer. The bottom wall 74 has a relatively large opening 75, and a correspondingly large conduit 80 is attached to this wall about the opening and extends down through the outlet 22 of the tank and into the inlet 4 of the closet bowl.

Figure 3:
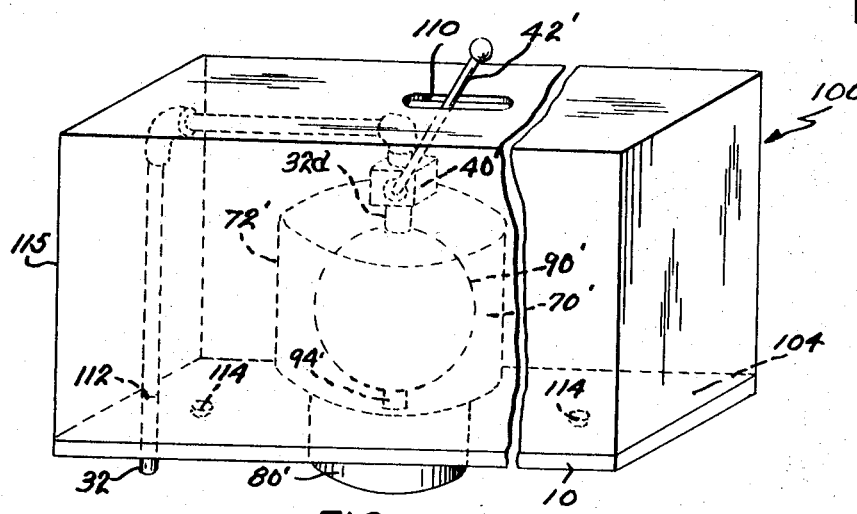
FIG. 3 is a perspective, broken view of a modified embodiment, wherein a separate housing encloses the flushing unit and eliminating the closet tank and wherein the unit is adapted for mounting directly on the toilet bowl.

The lower wall 74 of the chamber can support silencer member 90, herein shown as a sphere, supported on a stem 94 that, in turn, is held in position by spider legs 96 that rest on said lower wall 74 and position the member 90 accurately with respect to the side walls 72 of the chamber. The side walls are shown in FIG. 3 as cylindrical, and though this is the preferred shape, other symmetrical configurations are satisfactory. The walls of the silencer chamber 70 and the silencer member 90 are formed of sound deadening material such as plastic or rubber-like materials. For instance, member 90 may be formed of rubber while chamber 72 may be plastic, and as shown. Further, the silencer chamber 70 is constructed to enclose a substantial volume such that the water discharged therein from the valve 40 can flow easily by gravity over the silencer element 90, through the opening 75 in the bottom wall 74 and into the discharge conduit 80 to the bowl 2. It is preferred that the silencer member 90 be so positioned that its upper extremity is closely proximate to the opening 77 in the top wall 76, and in axial alignment with conduits 32d and 80, so that water from valve 40 impinges on the member 90 at a point which is the projection of the axis of the stem 94. The discharge conduit 80 serves the dual purpose of acting as an outlet for the silencer chamber 70 and, in the present embodiment, is further designed to act as a partial support for the flushing unit F. To this end the conduit 80 is attached to the lower wall 74 about the opening 75 and extends down through the conventional outlet 22 of the flush tank. The seal ring 19 preferably of deformable composition, is used to effect a tight friction seal at this opening. The cross-sectional area of the conduit 80 is sufficiently great to allow unimpeded flow of the flush water from the silencer chamber 70 to the toilet bowl 2.

Figure 4:
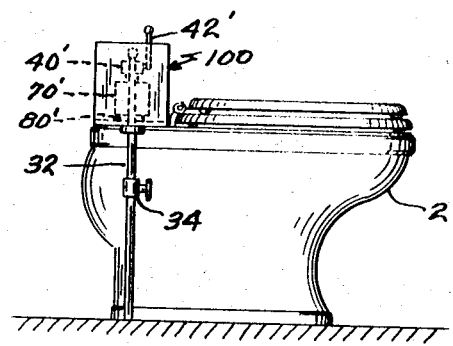
FIG. 4 illustrates the unit of FIG. 3 mounted on the toilet fixture.

FIGS. 3 and 4 illustrate a modified version of the invention in that the latter is adapted for installation directly to the toilet bowl 2 without the need of the flush tank. In this version, the unit is encased in a housing 100 that rests on the bowl 2 and has accommodation in the form of a slot 110 for the valve actuating lever 42'. The conventional water supply line 32 is brought up through opening 112 in the bottom wall 104 of housing 100 to valve 40'. The housing may be secured to the bowl 2 by bolts (not shown) passing through holes 114 in the bottom wall 104 of the housing. Actuation of the flushing mechanism is done by manual movement of lever 42'. Like the first described embodiment, the cycle of the valve may be totally under the control of the operator or may be timed to close in a predetermined interval after it is tripped by use of appropriate known mechanisms. The other parts of the flushing unit may be generally similar to those of the first described embodiment and are desginated with similar reference numbers except that the suffix prime (') has been added thereto. The upper portion 115 of the housing 100 may be detachably connected to the bottom wall 104 as by means of a snap fit or fasteners or any other suitable means, so as to provide ready access to the housing interior.

Figure 2:
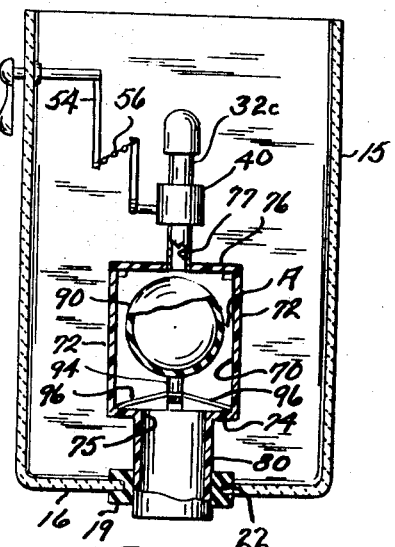
FIG. 2 is a side elevational view, on a slightly enlarged scale, of the structure of FIG. 1 showing the silencer chamber and silencer element in fragmentary section and illustrating the connection of the chamber with the tank outlet.

The operation of the above embodiments may be as follows: The pattern of procedure for the use of the subject device is similar to that for the conventional flushing system. When my device is installed in an existing flush tank, actuation of the flush handle 42 operates valve 40 and water from the high pressure inlet line 32 is delivered to the silencer chamber 70. Preferably, the time period that valve 40 is open is pre-set and under the influence of the conventional closing mechanism built into the valve. However, the valve can be under the full control of the operator. By virtue of the silencer member 90, the surge of flush water discharged from the valve 40 or 40' is quietly handled in the chamber 70 and 70' and caused to flow smoothly and quickly through said chamber, thence generally down the sides of the outlet conduit 80 or 80' without turbulence and noise from whence it is delivered in a symmetrical pattern to the toilet bowl 2 for distribution about the interior ducting therein. The chamber 70 is of relatively large size and the size of the siliencer member 90 for use therein is so chosen that the area of clearance (i.e. the ring of space between member 90 or 90' and the side wall 72 or 72' of the chamber 70 or 70') designated A in FIG. 2, is substantially larger than the cross-sectional area of the inlet conduit 32d, and substantially smaller than the area of outlet opening 75 in outlet conduit 80. For instance, an expeditious arrangement has been found to be that inlet conduit 32d and associated inlet opening 77 each be approximately ½ inch diameter, the clearance between member 90 or 90' and the interior of chamber 70 and 70' be approximately ¼ inch with member 90 or 90' having a diameter of approximately 3 inches, and with the diameter of outlet opening 75 being approximately 2½ inches.

The foregoing description is intended merely as an illustration of the presently preferred forms of the invention. It will readily occur to those acquainted in the art that minor modifications can be incorporated into the disclosed device and it is intended that the scope of the following claims cover all such modifications.

I claim:

1. In a flushing unit for a water closet comprising a valve adapted for connection to a source of pressurized water for controlling the supply of water to the bowl, a silencer chamber into which the water from the valve discharges, a silencer member of sound deadening material within the chamber over which the water pours in its travel to the bowl, said silencer member being generally symmetical with respect to the vertical center plane thereof, means for selectively actuating the valve, and conduit means between the valve, the chamber and the bowl, the minimum lateral area between said silencer member and the interior of said chamber being greater than the interior cross-sectional area of said conduit means connecting said valve and said chamber, and smaller than the interior cross-sectionl area of the conduit means from said chamber to the bowl.

2. A flushing unit in accordance with claim 1 wherein the silencer member is positioned immediately downstream from the conduit means connecting said valve and said chamber.

3. A flushing unit in accordance with claim 2 wherein the silencer member is in the form of a sphere having a cross-sectional area substantially greater than the cross-sectional area of the conduit means connecting said valve and said chamber.

4. A flushing unit in accordance with claim 1 wherein the silencer member is a hollow body supported in generally fixed position downstream from and proximate to the inlet opening to said chamber, whereby the water entering the chamber is caused to flow generally uniformly over the surface of said body and then into the outlet conduit means for discharge into the bowl.

5. A flushing unit in accordance with claim 4 wherein the support for the silencer member is in the form of a spider construction.

6. A flushing unit in accordance with claim 1 wherein said valve includes an actuating arm pivoted thereto, and means for selectively operating said arm from a point remote therefrom.

7. A flushing unit in accordance with claim 1 including an enclosure in which said flushing unit is mounted, conduit means connected to said valve and extending exteriorly of said enclosure for coupling to the source of pressurized water, the outlet conduit means between said chamber and the bowl extending exteriorly of said enclosure from the underside thereof, and means exteriorly accessible of said enclosure coupled to said valve for actuating the latter, said enclosure being adapted for mounting on the bowl in communication with the water inlet opening therein, and in lieu of the conventional water closet tank.

References Cited

UNITED STATES PATENTS

| | | | |
|---|---|---|---|
| 1,901,633 | 3/1933 | Clammons | 137—436 |
| 2,587,901 | 3/1952 | Robinson | 4—41 |
| 2,591,975 | 4/1952 | Southwick | 4—41 |
| 2,867,820 | 1/1959 | Gray | 4—41 |
| 2,905,949 | 9/1959 | Downin | 4—41 |
| 3,038,553 | 6/1962 | Peters | 138—30 X |
| 3,061,039 | 10/1962 | Peters | 138—30 X |
| 3,207,170 | 9/1965 | Fulton | 4—41 X |
| 3,362,030 | 1/1968 | McKinstry | 4—27 |

HENRY K. ARTIS, Primary Examiner

U.S. Cl. X.R.

4—18, 27, 41